Nov. 21, 1933.   H. A. HERNDON   1,935,879
FRICTION DRAFT GEAR
Filed Feb. 6, 1932   2 Sheets-Sheet 1
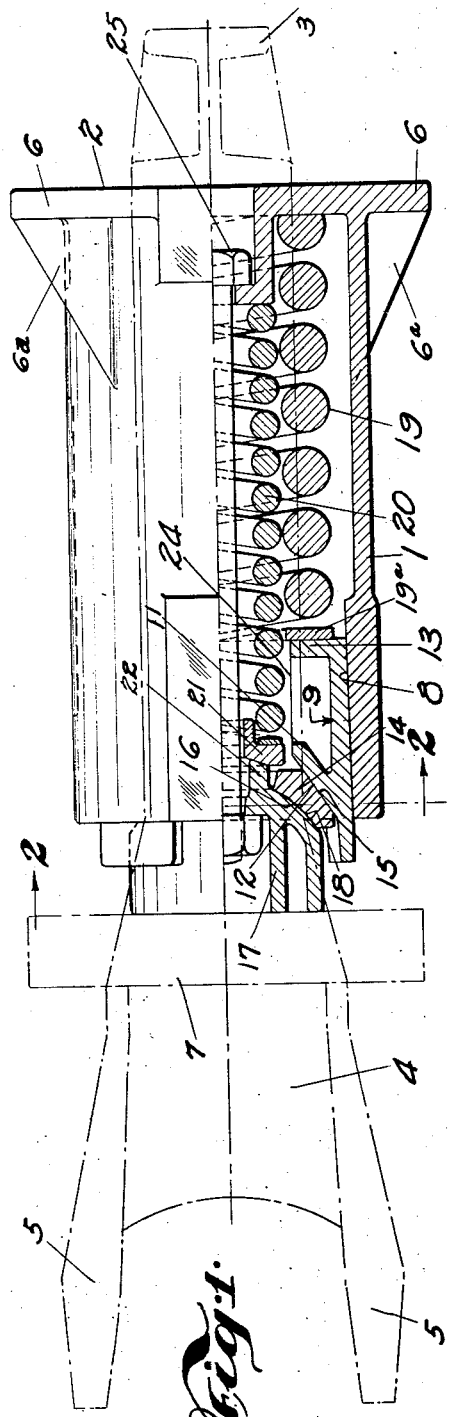
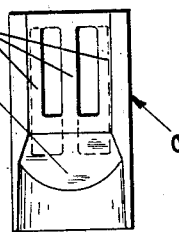
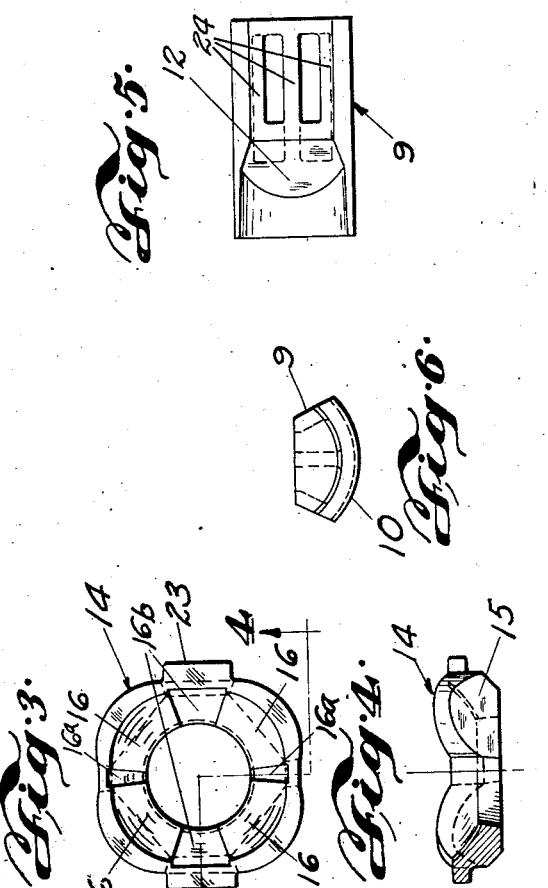
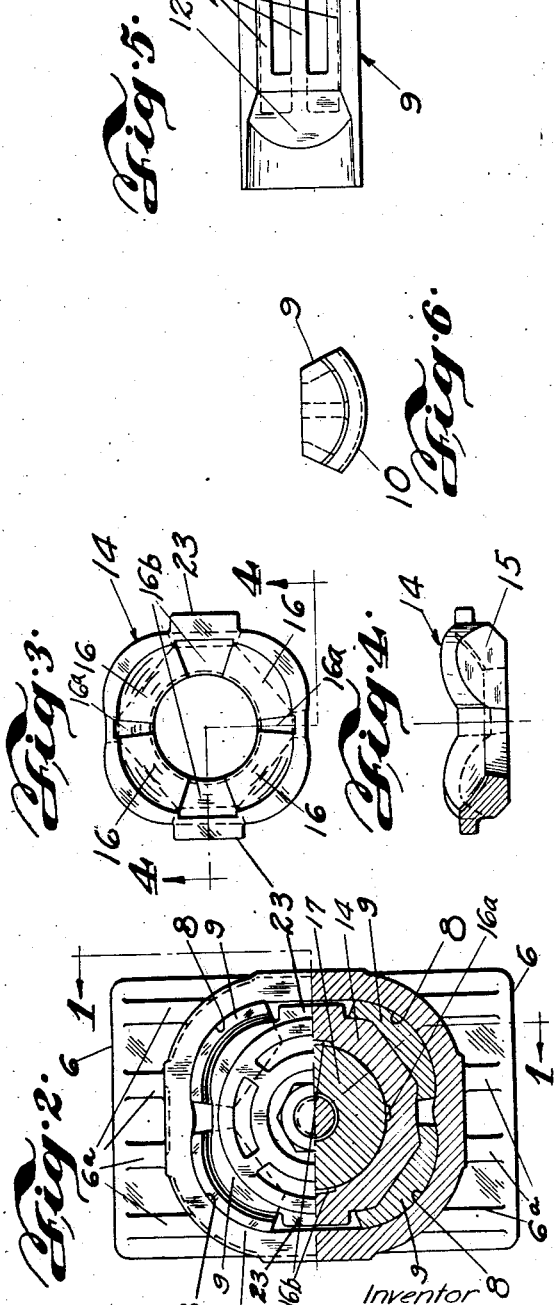
Inventor
Henry A. Herndon
By Rodney Bedell
Attorney Nov. 21, 1933.   H. A. HERNDON   1,935,879
FRICTION DRAFT GEAR
Filed Feb. 6, 1932   2 Sheets-Sheet 2

Inventor
Henry A. Herndon
By Rodney Bedell
Attorney

Patented Nov. 21, 1933

1,935,879

UNITED STATES PATENT OFFICE 1,935,879

FRICTION DRAFT GEAR

Henry A. Herndon, Chicago, Ill.

Application February 6, 1932. Serial No. 591,414

18 Claims. (Cl. 213—32)

This invention relates to shock absorbing mechanisms and consists in a novel friction draft gear for railway vehicles and particularly freight cars and locomotives having American Railway Association standard draft pockets.

The principal object of the invention is to provide means for effecting the positive release of all wedging and friction parts of the mechanism.

Another object is to provide for universal adjustment of the central force transmitting follower block with relation to the wedging members to equalize the pressure on the friction shoes.

Another object is to provide a draft gear in which the friction shoes will be capable of limited automatic rotational adjustment relative to the axis of the gear.

These objects and others are attained by the structure illustrated in the accompanying drawings, in which—

Figure 1 is in part a top view of the gear, the lower half being shown in section on a plane including the longitudinal center lines of the gear and one of the shoes.

Figure 2 is a front view and transverse section of the mechanism taken substantially on the line 2—2 of Figure 1.

Figure 3 is a front view of the wedge ring.

Figure 4 is a side view and horizontal section taken on the line 4—4 of Figure 3.

Figure 5 is an inner view of one of the friction shoes.

Figure 6 is an end view of the same.

Figure 7:
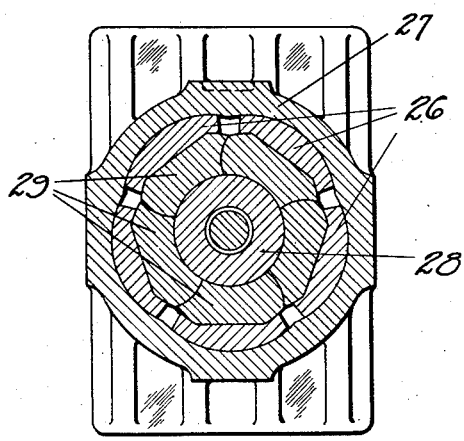
Figure 7 is a full sectional view corresponding to the lower half of Figure 2 but showing a modification.

The gear includes a casing 1 illustrated as of non-circular cross section and having a rear wall 2 abutting the inner face of bar portion 3 of a yoke 4, shown in broken lines, which is inserted between the draft sills of the car in the usual manner. The yoke has spaced lugs 5 at the front end, for attachment to the draw bar, and projections 6 at the rear end of the gear casing, to be described hereafter, reinforced by ribs 6a, are provided for cooperating with the usual rear stop lugs (not shown) on the draft sills or adjacent part of the car underframe. A main front follower 7 is inserted in the front portion of the yoke and extends to each side of the same in a manner to engage the usual front stop lugs (not shown) on the draft sills. While the left and right hand portions of the gear, Figure 1, are referred to as front and rear, respectively, it will be understood that the device may be reversed without materially affecting the operation thereof.

The casing 1 is shown as having four elongated arcuate friction surfaces 8 forming an annular series around the inner surface thereof at the front end. These surfaces are described about radii less than the shortest distance between the axis of the casing and the wall thereof and are preferably inclined inwardly relative to the casing wall to form wedging elements.

Seated against each of the surfaces 8 is a friction shoe 9 having an arcuate outer friction face 10 conforming in curvature with the corresponding surface 8 on the casing. On the inner surface of the shoe is an inclined flange 11 provided with a plane wedging surface 12, and a flange 13 extending at right angles to the rear end of the shoe. Ribs 24 connect flanges 11 and 13 and reinforce the shoe. While the gear shown has four friction shoes, the number of shoes and corresponding friction surfaces on the casing may be varied as desired.

A wedge ring element 14 has inclined outer faces 15 in wedging engagement with the inner shoe surfaces 12 and on the inside is provided with an annular series of spherical surfaces 16. A pair of diametrically opposite lips 23 inserted between adjacent shoes prevent excessive rotary movement of the ring relative to the shoe. Slots 16a and 16b between surfaces 16 provide for concentration of draw bar forces upon the friction shoes, but these are not essential to the effective operation of the device.

Draft and buffing forces are transmitted to the gear through a centrally disposed follower block 17 which abuts main front follower 7. Block 17 has a spherical face 18 surrounding the rear portion thereof which is seated against the surfaces 16 on the ring 14.

The inward movement of the shoes 9 is resisted by a main spring resistance 19 having a flattened end 19a abutting flanges 13. An inner release spring 20 carries a follower plate 21 at the front end which directly engages a rearwardly projecting boss 22 on the central follower block 17. The engaging surfaces of follower plate 21 and boss 22 are spherical and these surfaces cooperate with the engaging surfaces 16 and 18 of the ring and block, respectively, to permit universal adjustment of the block. Accordingly, the draw bar is permitted free movement in any direction without unduly straining the draft mechanism. A retainer bolt 25 maintains the follower block and wedging elements under initial compression in fixed relation with the casing.

Follower plate 21 is wider than boss 22 and overlaps the ring 14. The ring, however, in the normal position of the mechanism, is spaced forwardly of plate 21. It will be apparent that during the closing movement of the mechanism under buffing or draft forces, draw bar forces will be transmitted through the central follower block 17 and ring 14 to thereby wedge shoes 9 against the casing and increase the frictional resistance offered to the draw bar. These forces will also be directly applied through boss 22 and follower plate 21 to the inner release spring 20.

Block 17 has non-wedging engagement with ring 14 and accordingly upon release of the draw bar pressure the inner spring 20 will immediately unseat block 17 from the ring. The ring obviously cannot collapse to immediately release the pressure on the shoes and follower plate 21 during its outward movement will strike the rear surface of the ring, forcefully unseating the same. This releases the binding pressure on the friction shoes and permits main resistance spring 19 to return the shoes to normal position. Thus it will be seen that means is provided for effecting positive release of all wedging elements.

The restricted arcuate friction surfaces of the casing and shoes and the plane engaging surfaces of the shoes and the interposed ring 14 cooperate to permit automatic adjustment of the shoes in case of wear, the compression of the mechanism tending to force each shoe into the tightest position. These restricted friction surfaces also limit the extent of rotational adjustment of the shoes so that the shoes will remain at all times in substantially the same relative position resulting in the most effective operation of the mechanism.

If desired, the engaging surfaces of block 17 and ring 14 may be made plane instead of spherical, eliminating the universal adjustment feature referred to above but without affecting the releasing action. Moreover, the unseating effect of the release spring follower plate upon the ring might be utilized with other wedging arrangements.

For example, abutting segmental wedges may be substituted for the ring 18, as illustrated in Figures 7 to 13, inclusive. In Figures 7 to 10, in which the gear casing is also modified to the extent of being provided with five friction shoes 26 in place of the four utilized in the first form described. The casing 27, the friction shoes, and follower block 28 are, in general, similar to the corresponding parts in the first form.

Figure 8:
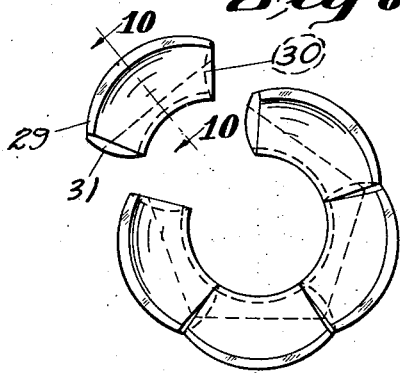
Fig. 8 is an elevation showing the wedge ring in Figure 7 with one segment removed.
Figure 9:
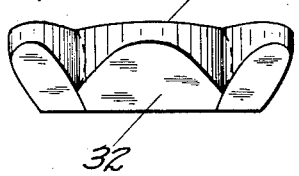
Figure 9 is a side view of the segmental ring.
Figure 10:
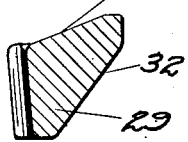
Figure 10 is a section through one of the segments of the modified ring taken on the line 10—10 of Figure 8.

The interposed wedge ring, shown in detail in Figure 8, is formed of a plurality of separate, abutting segments 29, each having a concave abutting face 30 on one end and a complementary convex face 31 on the other end. The segments have outer wedge surfaces 32 for engaging the friction shoes, and inner surfaces 33 for cooperating with the central follower 28. Surfaces 32 and 33 are shown as plane and disposed at different angles to the axis of the casing, but the cooperating faces of the follower block and segments may be spherical, as in case of block 17 and ring 14 in Figure 1, to permit universal adjustment of the follower block.

Figure 11:
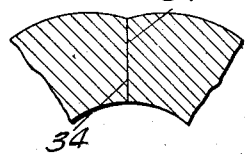
Figures 11, 12 and 13 are fragmentary sectional views showing various modified forms of joints between the segments.

In Figure 11, both abutting faces 34 of the segments are plane. In this form, as well as in Figures 7 to 9, the opposing pressures between the follower block and shoes tend to maintain the ring segments in proper relative position. The segmental construction of the ring permits relative movement of the parts longitudinally of the gear to adjust themselves to accommodate variations in the follower block and wedge shoes, but the segmental ring will rigidly resist any transverse force tending to contract the ring.

Figure 12:
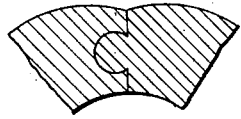
Figure 13:
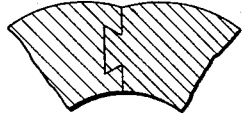

In Figures 12 and 13, a plurality of segments are shown interlocked by means of tongue and socket joints to form non-expanding but flexible rings. The segmental ring in each of the modified forms is non-collapsible, and consequently cannot stick to the central follower or get out of position, but relative movement between the segments is permitted to a certain extent, which movement imparts desirable flexibility to the ring.

Obviously, the invention is not limited to the exact details of the embodiments shown. For instance, the particular design of the casing is not essential and this may be of circular, octagonal, or of other suitable shape. Also the spring arrangement may be varied. The suggested modifications and others may be made without departing from the spirit of the appended claims, and the exclusive use of all such modifications is contemplated.

What is claimed is:

1. In friction shock absorbing mechanism, a casing, friction shoes and a central follower block cooperable therewith, wedging means interposed between said shoes and said block, said means rigidly resisting transverse forces tending to contract the means against said block, a spring resistance for said shoes, a release spring, and a follower member between said release spring and said block, said member being normally spaced from said interposed means and overlapping the same in a manner to forcefully strike and unseat said means during the release movement of the mechanism, said block having abutting non-wedging contact with said means throughout compression of the mechanism.

2. In friction shock absorbing mechanism, a casing, interior friction shoes cooperable therewith, a follower block, a spring resistance for said shoes, a release spring operable on said block, a follower element between said block and release spring, and a separate ring element disposed to transmit wedging pressure from said block to said shoe, said ring element being normally spaced from said follower element.

3. In friction shock absorbing mechanism, a casing, interior friction shoes cooperable therewith, a follower block, and means for positively unseating said shoes and said block during the releasing movement of the mechanism, said means comprising a main spring resistance for said shoes, a release spring operable upon said block through a follower element, and a separate ring disposed to transmit wedging pressure from said block to said shoes, said ring being normally spaced from said element, but being positioned to be struck and unseated by said follower element during outward movement thereof in case of adherence between said ring and said shoes or said shoes and said casing.

4. In a friction shock absorbing mechanism, a main front follower, a casing, friction shoes cooperable with said casing and having inner wedge faces, a main spring resistance for said shoes, a follower block abutting said front follower, a separate ring disposed to transmit wedging pressure directly from said block to said shoes and a release spring and follower element for said block, said element directly engaging said block and being normally spaced from said ring.

5. In a friction shock absorbing mechanism, a main front follower, a casing, friction shoes cooperable with said casing and having inner wedge faces, a follower structure having wedge surfaces cooperating with said shoe faces, a main spring resistance for said shoes, and a release spring and follower plate for said structure, said structure comprising a central block engaging said front follower and said plate and a separate ring element separating said block and shoe faces and normally spaced from said front follower and said plate.

6. In a friction shock absorbing mechanism, a main front follower, a casing, friction shoes cooperable with said casing and having inner wedge faces, a follower structure having wedge surfaces cooperating with said shoe faces, a main spring resistance for said shoes, and a release spring and follower plate for said structure, said structure comprising a central block engaging said front follower and said plate and a separate ring element separating said block and shoe faces, the engaging faces of said block and said ring element and said block and plate being spherical permitting universal adjustment of said block relative to said casing.

7. In a friction shock absorbing mechanism, a main front follower, a casing having inwardly and rearwardly inclined friction surfaces, friction shoes cooperating with said surfaces and having inner wedge faces, a follower block, a main spring resistance for said shoes, a release spring directly operating upon said block, and a separate ring element between said block and shoes and having inner faces abutting and disposed to receive longitudinal forces from said block and outer wedge faces cooperating with the inner wedge faces of said shoes.

8. In friction shock absorbing mechanism, a casing, a wedging follower member, friction shoes interposed between said member and said casing, said shoes and member being movable longitudinally of said casing, means permitting automatic rotational adjustment of said shoes relative to said casing and said member, and means automatically limiting said adjustment.

9. In friction shock absorbing mechanism, a casing, a plurality or arcuate friction surfaces therein of less radius than the shortest distance from the axis of said casing to the main portion of the wall thereof, a wedging follower member movable longitudinally relative to said casing, and friction shoes interposed between said member and said casing, said shoes having outer and inner friction surfaces conforming with the abutting friction surfaces of said casing and follower member, respectively; said shoes being rotationally adjustable relative to said casing and said abutting friction surfaces cooperating to limit said adjustment.

10. In friction shock absorbing mechanism, a casing, a wedging follower structure movable longitudinally relative to said casing, and friction shoes interposed between said structure and said casing, said structure comprising a central force transmitting block and separate wedging means disposed to receive longitudinal pressure directly from said block and having spherical engagement therewith permitting universal adjustment of said block, and said shoes engaging said casing along arcuate surfaces of different radius than the least radius of said casing permitting automatic rotational adjustment of said shoes and limiting the same.

11. In friction shock absorbing mechanism, a casing, interior friction shoes cooperable therewith, a follower block, a main spring resistance for said shoes, a release spring operable on said block, a follower element between said block and release spring, and an annular series of abutting wedge members disposed to form a non-collapsing ring to transmit longitudinal buffing forces between said block and said shoes, said members being normally spaced from said follower element, said wedge members rigidly resisting transverse compressive forces tending to contract the members about said block.

12. In friction shock absorbing mechanism, a casing, interior friction shoes cooperable therewith, a follower block, a main spring resistance for said shoes, a release spring operable directly on said block, and an annular series of abutting wedge members disposed to transmit wedging pressure between said block and said shoes, said members being interlocked in a manner to form a non-expanding flexible ring.

13. In friction shock absorbing mechanism, a casing, interior friction shoes cooperable therewith, a follower block, a main spring resistance for said shoes, a release spring operable directly on said block, and an annular series of abutting wedge members disposed to transmit wedging pressure between said block and said shoes, there being interengaging elements on said members maintaining the same substantially in a predetermined relation with each other in a ring, but permitting sufficient relative movement of said members to afford flexibility to the ring.

14. In friction shock absorbing mechanism, a casing, interior friction shoes, a follower block, spring resistance for said shoes, release spring resistance including an element engaging said block, and a rigid wedge device interposed between said block and said shoes and surrounding said block, said device having wedging engagement with said shoes and being engageable by said release element after initial movement thereof whereby said block is unseated from said wedge device by said element and said wedge device is then unseated from said shoes.

15. In friction shock absorbing mechanism, a housing, internal friction shoes cooperable therewith, a spring resistance for said shoes, follower structure in telescoping relation with said casing, a release spring, and wedge means surrounding said structure, said means rigidly resisting transverse forces tending to contract the means against said structure, said structure being arranged to alternately move said means in opposite directions during the compression and release movements of the mechanism.

16. In friction shock absorbing mechanism, follower structure arranged at one side for cooperating with a coupler shank, a release spring engaging the other side of said structure, a wedging device surrounding and movable by said structure alternately in opposite directions longitudinally of the mechanism, said device rigidly resisting transverse forces tending to contract the device against said structure, friction shoes movable in one direction by said wedging device, and a casing slidably engaged by said shoes when moved in said direction.

17. In a friction shock absorbing mechanism, a main front follower, a casing having friction surfaces, friction shoes cooperating with said surfaces and having inner wedge faces, a follower block, a spring resistance for said shoes, a release spring directly operating upon said block, and a separate collar device normally seated against said block and disposed to receive longitudinal forces therefrom and having outer wedge faces cooperating with the inner wedge faces of said shoes, said device rigidly resisting transverse forces tending to contract the device against said block.

18. In friction shock absorbing mechanism, a casing, interior friction shoes cooperable therewith, a follower block, a spring resistance for said shoes, a release spring operable on said block, a follower element between said block and release spring, and a plurality of wedge members disposed to transmit longitudinal buffing forces between said block and said shoes, said members being normally spaced from said follower element, said wedge members rigidly resisting transverse compressive forces tending to contract the members about said block.

HENRY A. HERNDON.